C. O. VANTREASE.
WHEEL FOR VEHICLES.
APPLICATION FILED APR. 13, 1914.

1,125,220.

Patented Jan. 19, 1915.
2 SHEETS—SHEET 1.

Inventor
CLARENCE ODUM VANTREASE

Witnesses
Robert M. Sutphen
A. L. Hind

By Watson E. Coleman
Attorney

C. O. VANTREASE.
WHEEL FOR VEHICLES.
APPLICATION FILED APR. 13, 1914.

1,125,220.

Patented Jan. 19, 1915.
2 SHEETS—SHEET 2.

Inventor
CLARENCE ODUM VANTREASE

Witnesses

UNITED STATES PATENT OFFICE.

CLARENCE ODUM VANTREASE, OF NASHVILLE, TENNESSEE.

WHEEL FOR VEHICLES.

1,125,220.  Specification of Letters Patent.  Patented Jan. 19, 1915.

Application filed April 13, 1914. Serial No. 831,542.

*To all whom it may concern:*

Be it known that I, CLARENCE ODUM VANTREASE, a citizen of the United States, residing at Nashville, in the county of Davidson and State of Tennessee, have invented certain new and useful Improvements in Wheels for Vehicles, of which the following is a specification, reference being had to the accompanying drawings.

This invention relates to certain improvements in wheels for vehicles and has relation more particularly to a device of this general character in which springs are used to afford the resilient action now commonly accomplished by means of pneumatic tires or the like; and the object of the invention is to provide a novel and improved device of this general character which will be strong and durable and not subject to rapid wear, the device being especially applicable as a traction wheel for an automobile or the like and which provides simple, efficient and comparatively inexpensive cushion wheels adapted to noiselessly absorb all the shocks and jars incident to the travel of an automobile or the like.

The invention consists in the details of construction and in the combination and arrangement of the several parts of my improved wheel whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1:
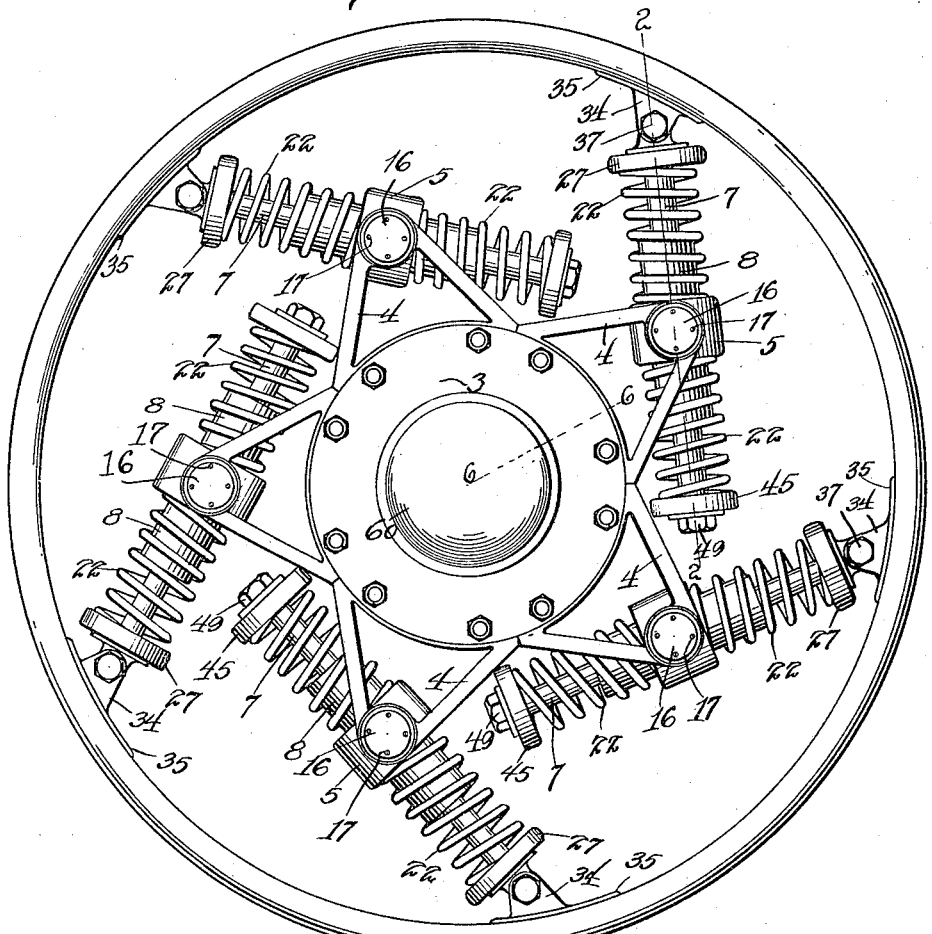
Figure 6:
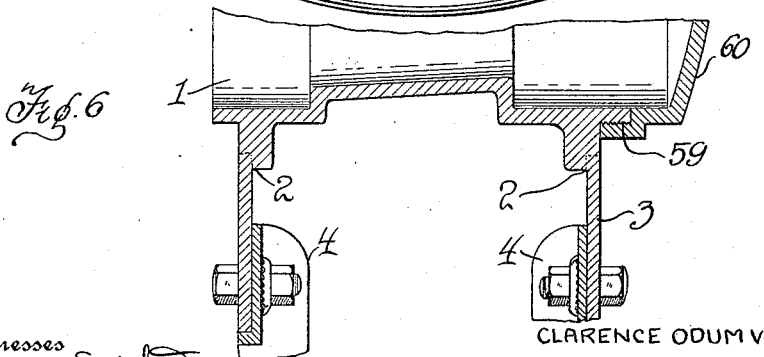

Figure 1 is an elevational view of a wheel constructed in accordance with an embodiment of my invention; Fig. 2 is an enlarged sectional view taken substantially on the line 2—2 of Fig. 1; Fig. 3 is an elevational view, detached, of a plug herein embodied; Fig. 4 is an outer plan view, with a part in section, of one of the cap members herein embodied; Fig. 5 is an elevational view of a stud member herein included; and Fig. 6 is an enlarged sectional view taken substantially on the line 6—6 of Fig. 1.

As disclosed in the accompanying drawings, 1 designates a hub of predetermined configuration provided adjacent its opposite extremities with the annular flanges 2 to which are adapted to be welded or otherwise secured the disks 3. Secured to the periphery of each of the disks and radiating therefrom are the supporting members 4, herein disclosed as substantially V shaped in form and having their base portions provided with a segmental shoulder adapted to snugly engage the periphery of the disk. While the supporting members may be secured to their respective disks in any manner desired, I prefer that such connection be detachable so that parts of my improved wheel may be readily removed for the purposes of repair or replacement without in any way affecting the balance of the wheel.

The supporting members 4 of one disk are in alinement with the members of the second disk and are provided at their apices with the bearings 5 in which are adapted to be mounted the oppositely directed trunnions 6 carried by the elongated sleeve members 8.

The inner portion of the bore of each of the bearings 5 is enlarged, as indicated at 9, to afford a mounting for a bushing 10 surrounding the trunnion 6 and which is adapted to be removed when worn whereby it will be readily perceived that the life of the trunnion proper is greatly prolonged. The bushings 10 are adapted to fit snugly within the bores of the bearings 5 and while such engagement is such as to maintain such bushings against actual rotation I find in practice that it is especially desirable to employ a positive means for holding such bushings against rotary movement and as herein disclosed, I accomplish this purpose through the medium of the locking members 53 herein disclosed as elongated threaded members directed through the bearings 5 and impinging such bushings 10 as is believed to be clearly shown in Fig. 2 of the accompanying drawings. The outer extremities of the trunnions 6 are provided with the reversely threaded portions 11 adapted to be operatively engaged by the nuts 12 whereby the bushings 10 will be maintained in operative position upon the trunnions. Each of the trunnions is provided adjacent its inner extremity with an annular shoulder 14 adapted to contact with the inner end portion of the bearings 5 and interposed between such shoulders and the bearings is the friction washer 15, the outer or opposite ends of the bearings being adapted to be closed by the caps 16, herein disclosed as detachably held in operative position through the medium of the screw members 17.

Slidably directed through each of the sleeve members 8 is a tubular shaft or spoke member 7 and interposed between such shaft or member 7 and the inner surface of the member 8 is a cylindrical bushing 18, preferably of bronze, and at the ends of this bushing are the packing rings 19, herein disclosed as maintained in operative position by the annular compression members 20 in threaded engagement with the opposite extremities of the member 8.

The trunnions 6 project from an annular flange carried by the elongated member 8 and such flange is provided in its opposite faces with recesses or cavities 21 concentric to such member 7 and in which are adapted to be received the inner convolutions of the helical springs 22, the inner extremities of such springs being provided with the longitudinally directed extensions 23 adapted to be engaged within the recesses 24 produced in the bases of the annular cavities or recesses 21 whereby it will be readily perceived that such springs will be effectively maintained against axial rotation. While I disclose the recesses 24 as disposed in alinement with the trunnions 6, I wish to state that this is done only for convenience of illustration as in practice I prefer to have such recesses positioned in a plane at right angles to such trunnions for reasons which are believed to be self-evident.

The outermost spring 22 has its opposite extremity provided with a second longitudinally disposed projection 25 adapted to be received within a recess 26 formed in the inner face of a cap member 27, such cap member being provided on its outer face with the lugs or feathers 28 adapted to be received within suitable recesses or slots 29 produced in the inner surface of the head 30 of the stud member 31, said member 31 being provided with a threaded shank 32 adapted to close the outer end of the tubular shaft or spoke 7. The head 30 is provided with a bearing opening 33 which is adapted to be accommodated between the ears 34 projecting inwardly from the plate 35 secured to the inner surface of the rim of the wheel and through which is directed the shaft or bolt 36. As herein disclosed, the head 37 of the bolt is provided with a projection 38 adapted to be accommodated within a recess or cavity 39 formed in the adjacent face of an ear 34 whereby it will be seen that such shaft or bolt 36 is effectively maintained against axial rotation. The free extremity of the shaft or bolt projects beyond the opposite ear 34 and is engaged by the nut 40 which nut is maintained against displacement through the medium of the cotter pin 41 directed transversely through the shaft or bolt 36 forwardly of such nut, as is believed to be clearly shown in the drawings. The bolt 36 between the ears 34 is also surrounded by a bushing 42, for purposes which are believed to be self-evident. The outer extremity of the inner spring 22 is also provided with a longitudinally directed extension 43 adapted to be received within a suitable recess or pocket 44 in a cap 45, which cap has its under surface provided with the lugs or feathers 46 adapted to be accommodated within corresponding grooves or recesses 47 produced in the head 48 of a plug 49, herein disclosed as in threaded engagement with the tubular shaft or spoke member 7.

The shafts or spoke members 7 are of such a length as not to touch either the rim or hub of the wheel, as the springs 22 are of such a gage as to close before the ends of such shafts or spokes contact with either the rim or hub. As is believed to be self-evident, these shafts or spoke members 7 are positioned midway between the hub and rim, before the wheel is applied to the vehicle.

It will also be readily perceived that the particular manner in which I mount the springs 22 serves to maintain the lugs or feathers 28 and 46 in their respective recesses 29 and 47 whereby it will be readily perceived that the necessity of lock nuts is entirely dispensed with, as is believed to be self-evident.

The tubular shaft or spoke member 7 is adapted to contain a lubricant and, as herein disclosed, is provided intermediate its length with the transverse ports 50 adapted to register with the bores or channels 51 of the trunnions 6, such trunnions being provided with the laterally disposed openings 52 in communication therewith in order that the bushings 10 may be properly lubricated. Also in communication with the bore of the shaft or spoke member 7 is the bore or passageway 54 disposed longitudinally of the shank 32 in communication with the opening 33 whereby the bushing 42 may be properly lubricated and such bushing is also provided with an opening 55 adapted to register with the bore 54 whereby the shaft or bolt 36 proper will be also lubricated. By this arrangement, it will be seen that all the movable parts of the device are thoroughly and effectively lubricated. The lubricant is adapted to be applied through the lower end of the shaft or spoke member 7 and for this reason the plug 49 is provided with a longitudinal bore or passage way 56, the outer end portion of which being closed by the stud or closure 57 in threaded engagement with such bore. I also find it in practice to be especially advantageous to interpose between the bushing 10 and the adjacent nut 12, a friction washer 58.

While I do not wish to be understood as limiting myself to a particular form of hub 1, I find it in practice desirable to have a forward portion thereof projected, as at 59, the periphery of which projected portion is threaded in order to be operatively engaged by the cap member 60, as is believed to be clearly shown in the accompanying drawings.

From the foregoing description, it is thought to be obvious that a wheel constructed in accordance with my invention is of an extremely simple and comparatively inexpensive nature and is particularly well adapted for use by reason of the convenience and facility with which it may be assembled and by reason of the effectiveness with which it performs its functions, and it will also be obvious that my invention is susceptible of some change and modification without material departure from the principles and spirit thereof and for this reason, I do not wish to be understood as limiting myself to the precise arrangement and formation of the several parts herein shown in carrying out my invention in practice.

I claim:

1. A resilient wheel including a hub provided with spaced annular disks, a rim, supporting members secured to such disks, the members of one disk being in alinement with the members of a second disk, a sleeve provided with an annular flange intermediate its length, oppositely directed trunnions carried by the flange and adapted to be mounted in the alined supporting members, the opposite faces of the flange of the sleeve being provided with annular recesses, the bases of such recesses being provided with pockets, a shaft operatively connected with the rim and disposed through the sleeve, enlargements carried by the shaft adjacent the opposite extremities thereof, and helical springs surrounding the shaft at opposite sides of the flange, each of such springs being provided with a longitudinally disposed extension adapted to be accommodated within a pocket in the flange of the sleeve.

2. A resilient wheel including a sleeve provided with oppositely directed trunnions, said trunnions being provided with bores in communication with the bore of the sleeve, a tubular shaft disposed through such sleeve and having laterally directed ports adapted to register with the bores of the openings, a headed member detachably engaged within one extremity of the bore of the shaft, such member being provided with a transverse opening through its head, a longitudinal bore in communication with such opening and with the bore of the shaft, a plug in detachable engagement with the opposite extremity of such shaft, said plug being provided with a longitudinal bore adapted to communicate with the bore of the shaft, and a member for closing the bore of the plug and tensioning means coacting with the shaft.

3. A resilient wheel including a hub provided with spaced disks, a rim, supporting members engaged with the disks, the members of one disk being alined with the members of a second disk, a tubular sleeve provided with trunnions adapted to rotatably engage the supporting members, a tubular shaft operatively connected with the rim and disposed through the sleeve, the trunnions being provided with bores in communication with the bore of the shaft and tensioning means interposed between the sleeve and the opposite extremities of the shaft.

4. A resilient wheel including a hub provided with spaced disks, a rim, supporting members engaged with the disks, the members of one disk being alined with the members of a second disk, a tubular sleeve provided with trunnions adapted to rotatably engage the supporting members, a tubular shaft operatively connected with the rim and disposed through the sleeve, the trunnions being provided with bores in communication with the bore of the shaft, tensioning means interposed between the sleeve and the opposite extremities of the shaft, and bushings surrounding the portions of the trunnions in engagement with the supporting members, the trunnions being provided with laterally disposed openings in communication with the bore thereof and discharging upon the inner faces of the bushings.

5. A resilient wheel including a hub provided with spaced disks, a rim, supporting members engaged with the disks and provided with bearings, the members of one disk being alined with the members of a second disk, a sleeve provided with trunnions rotatably supported by the bearings of the supporting members, bushings within the bearings of the supporting members surrounding the trunnions, means coacting with the bearings and the bushings for holding said bushings against axial rotation, a shaft operatively connected with the rim and disposed through the sleeve, and tensioning means interposed between the sleeve and the opposite extremities of the shaft.

6. A resilient wheel including a hub, supporting members carried thereby, a sleeve mounted for rocking movement between certain of such members, a rim, a tubular shaft operatively connected with such rim and disposed through such sleeve, a cap member positioned adjacent one extremity of the shaft, and provided with outwardly disposed lugs, a plug for the adjacent end of the tubular shaft provided with a head overlying the cap, such head being provided with recesses adapted to receive the lugs of the cap, and a tensioning member interposed between the sleeve and the cap, such tensioning member maintaining the lugs of the cap within the recesses of the head of the plug.

In testimony whereof I hereunto affix my signature in the presence of two witnesses.

CLARENCE ODUM VANTREASE.

Witnesses:
W. M. LONG,
D. T. CROCKETT.

Copies of this patent may be obtained for five cents each, by addressing the "Commissioner of Patents, Washington, D. C."